United States Patent [19]

Uchiyama et al.

[11] Patent Number: 5,188,882
[45] Date of Patent: Feb. 23, 1993

[54] MULTILAYERED MOLDING

[75] Inventors: Akira Uchiyama; Naoaki Jimbo; Shizuo Shimizu, all of Ichihara, Japan

[73] Assignee: Mitsui Petrochemical Industries, Ltd., Tokyo, Japan

[21] Appl. No.: 804,591

[22] Filed: Dec. 10, 1991

Related U.S. Application Data

[60] Division of Ser. No. 593,499, Oct. 4, 1990, Pat. No. 5,096,652, which is a continuation of Ser. No. 302,456, Jan. 27, 1989, abandoned.

[30] Foreign Application Priority Data

Jan. 29, 1988 [JP] Japan .................................. 63-19316
Jan. 29, 1988 [JP] Japan .................................. 63-19317

[51] Int. Cl.$^5$ ................................................ B32B 3/26
[52] U.S. Cl. .................................. 428/159; 428/316.6; 428/319.7; 428/319.9; 428/516
[58] Field of Search .................. 428/424.2, 516, 316.6, 428/319.3, 319.7, 319.9, 159

[56] References Cited

U.S. PATENT DOCUMENTS 4,889,762 12/1989 Uchiyama et al. .................. 428/516
4,894,289 1/1990 Otawa et al. ..................... 428/424.2

Primary Examiner—William J. Van Balen
Attorney, Agent, or Firm—Birch, Stewart, Kolasch & Birch

[57] ABSTRACT

A multilayered molding is disclosed, which has a base molding outer layer mainly composed of a partial cross-linking type substance A obtained from polyolefin resin and ethylene-α-olefin copolymer rubber or a mixture B of polyolefin resin and ethylene-α-olefin copolymer rubber or both. The outermost layer is in direct contact with and forms a lamination with an inner intermediate layer or a base molding composed of a polyethylene resin, for instance, and is firmly bonded to the outermost layer. A method of manufacturing such multilayered molding is also disclosed, in which a composite sheet of the thermoplastic elastomer with or without the intermediate layer is preliminarily heated, followed by being suction held in close contact with a mold cavity inner surface, thus forming a surface layer. The mold is then clamped, and fluidized and plasticized polyolefin resin is injected to produce the molding. The polyolefin resin may also be injected prior to the clamping.

6 Claims, 3 Drawing Sheets

MULTILAYERED MOLDING

This application is a divisional of copending application Ser. No. 07/593,499, filed on Oct. 4, 1990, is now U.S. Pat. No. 5,096,652, which is a continuation of application Ser. No. 07/302,456 filed on Jan. 27, 1989, now abandoned, the entire contents of which are hereby incorporated by reference.

BACKGROUND OF THE INVENTION

1. Field of the Invention

The present invention relates to a multilayered molding and a method of manufacturing the same, the multilayered molding being structured by a base molding body made of a polyolefin resin and a surface layer made of another type of synthetic resin and layered on the base molding body made of polyolefin resin.

2. Discussion of Related Art

Hitherto, multilayered moldings are known that are structured by a base molding body made of a synthetic resin and a surface layer made of another type of synthetic resin and layered on the base molding body as a 3D-molding whose surface is protected, or decorated by the synthetic surface layer which is printed as needed.

Such multilayered molding can be obtained in such a manner that: a synthetic resin sheet which had been previously molded by being attracted to the inner surface of the cavity of the injection mold be vacuum forming, and a synthetic resin in fluidized and plasticized state is injection-molded in the cavity. They are widely used mainly as interior or exterior parts for automobiles and building materials.

The molded bodies of the type described above has an advantage in that pictures on the molded bodies can be easily achieved simultaneously with the molding work by using the surface layer which had previously been drawn with letters or patterns.

Hitherto, the synthetic resin sheet or film used as the surface layer comprises, for example, polyvinyl chloride. However, the conventional materials for the surface layer suffers from a poor attracting performance at the vacuum forming so that it becomes difficult to form a molding work having a complex 3D shape. As a result, there arises problems that cracks are generated at the corners and that generation of wrinkles cannot be prevented. Furthermore, the quality of the embossment applied to the inner surface of the mold cavity by transferring the emboss pattern is insufficient. In addition, the surface layer made of polyvinyl chloride suffers from poor heat and low temperature resistance, causing the plasticizer therein to bleed out. As a result, such materials are insufficient to be used as interior parts for automobiles because of their rough touch. In addition, a problem arises in that the damage resistance is insufficient as well.

The inventors of the present invention have disclosed the multilayered moldings in Japanese Patent Laid-Open Nos. 57-20344, 57-188327, 60-87047, and 60-127149. The present invention is disclosed for the purpose of providing a further improved multilayered molding and a method of manufacturing the same.

SUMMARY OF THE INVENTION

To this end, an object of the present invention is to provide a multilayered molding and a method of manufacturing the same, the manufactured molding exhibiting excellent surface flexibility, heat resistance, low temperature resistance and damage resistance, and is capable of being easily manufactured.

A multilayered molding according to the present invention in which the surface of its base molding body made of polyolefin resin is layered with a surface layer, the surface layer of the multilayered molding comprising:

(1) an outer layer formed by a thermoplastic elastomer, which is constituted by a partial crosslinking type substance A obtained from polyolefin resin and ethylene-α-olefin copolymer rubber, a mixture B of polyolefin resin and ethylene-α-olefin copolymer rubber partial crosslinking type substance or both (2) an intermediate foamed layer made of flexible foaming material formed of a polyolefin resin foam body; and (3) a protection film layer mainly composed of a thermoplastic elastomer which is either a partial crosslinking type substance A obtained from polyolefin resin and ethylene-α-olefin copolymer rubber or a mixture B of polyolefin resin and ethylene-α-olefin copolymer rubber partial crosslinking type substance sandwiched between the base molding body and the intermediate foamed layer.

Since the molded body according to the present invention is structured by layering a sheet or a film made by combining the above-described outer layer (1), intermediate foam layer (2), and the protection film layer (3) on the base molding body, its flexibility, and smooth touch, and damage resistance can be improved.

A method of manufacturing such a multilayered molding can be exemplified by:

(A) a method of manufacturing a multilayered molding comprising: preheating a combined sheet or film constituted a thermoplastic elastomer, which is constituted by a partial crosslinking type substance A obtained from polyolefin resin and ethylene-α-olefin copolymer rubber, a mixture B of polyolefin resin and ethylene-α-olefin copolymer rubber partial crosslinking type substance or both intermediate foam layer made of a flexible polyolefin resin foam body and (3) a protection film layer mainly composed of a thermoplastic elastomer which is either a partial crosslinking type substance A obtained from polyolefin resin and ethylene-α-olefin copolymer rubber or a mixture B of polyolefin resin and ethylene-α-copolymer rubber partial crosslinking type substance, and then clamping a mold having a cavity with an inner surface after the combined sheet or film has been attracted and brought into contact with the inner surface of the cavity of the mold having a cavity with an inner surface with the outer layer positioned to contact the inner surface of the cavity of the mold, and fluidized and plasticized polyolefin resin is injected into the cavity to perform the molding.

(B) A method of manufacturing multilayered molding comprising: preheating a combined sheet or film constituted by (1), (2), and (3) by attracting and bringing the combined sheet or film to the inner surface of the cavity of the mold with the outer layer positioned to contact the inner surface of the cavity of the mold, introducing fluidized and plasticized resin into the cavity to which the combined sheet or film has been brought into close contact, and then clamped for the purpose of performing the molding.

Since the manufacturing method according to the present invention employs the combined sheet or film made of the above-described components (1), (2), and (3), in particular, since the outer layer made of a thermoplastic elastomer is provided, an excellent attractivity and contact with the inner surface of the mold cavity can be obtained so that it can be molded to fit to the complex 3D contour without any occurrence of cracks and wrinkles. In addition, the material can be introduced sufficiently deep into the embossing grooves, and thereby embossments can be performed easily.

Another multilayered molding according to the present invention comprises a thermoplastic elastomer, which is constituted by a partial crosslinking type substance A obtained from polyolefin resin and ethylene-α-olefin copolymer rubber, a mixture B of polyolefin resin and ethylene-α-olefin copolymer rubber partial crosslinking type substance of both which serves as the surface layer, and layered on the surface of the base molding body made of polyolefin resin.

The method of manufacturing is characterized that the above-described thermoplastic elastomer sheet or film is used for molding as an alternative to the combined sheet or film in the above-described methods (A) and (B). These methods are respectively referred to as methods (A-2) and (B-2).

DESCRIPTION OF THE PREFERRED EMBODIMENTS

Figure 1:
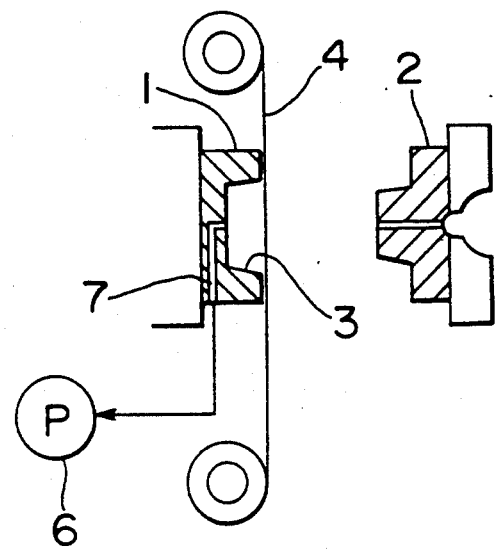
FIGS. 1 (a) to (d) illustrate the manufacturing method according to (A) or (A-2)
Figure 1:
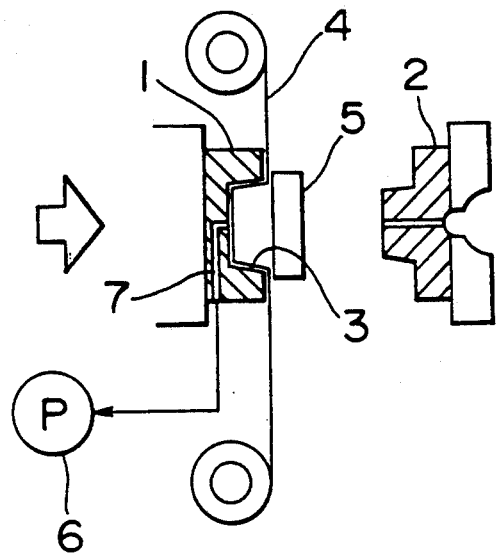
Figure 1:
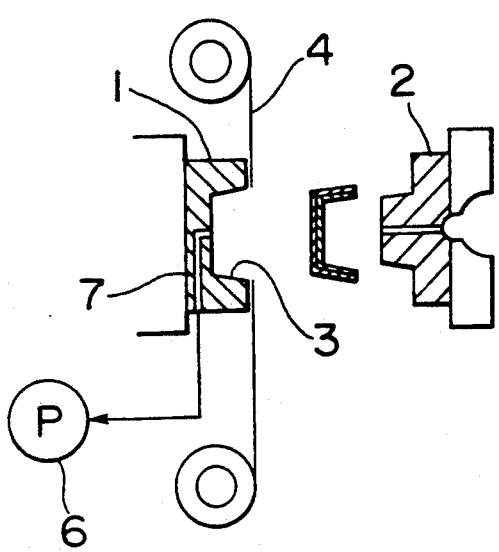
Figure 1:
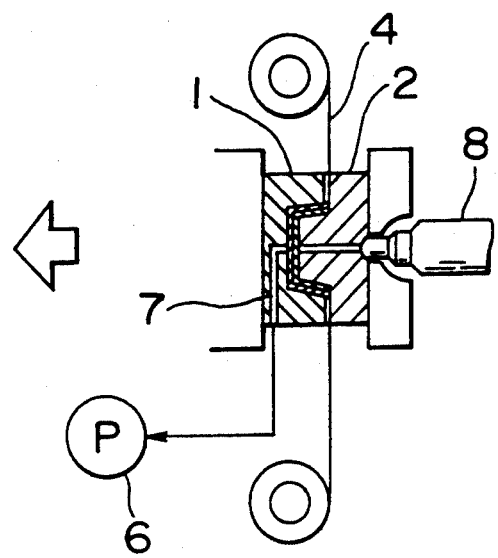

The multilayered molding according to the present invention has a surface layer, which consists of a lamination of an outer layer, an intermediate foamed layer and a protective film layer and is formed on the surface of a base molding made of polyolefin resin.

The outer layer of the surface layer is mainly composed of a thermoplastic elastomer, which is a partial crosslinking type substance A synthesized from polyolefin resin I and ethylene-α-olefin copolymer rubber.

Alternately, the outer layer is mainly composed of a thermoplastic elastomer which is obtained as a mixture B of polyolefin resin II and ethylene-α-olefin copolymer rubber partial crosslinking type substance. Further, the partial crosslinking type substance A and mixture B both constitute main components of the outer layer. The ethylene-α-olefin copolymer rubber partial crosslinking type substance which constitutes together with polyolefin resin II the thermoplastic elastomer constituted by the mixture B, is a partial crosslinking type substance obtaining from polyolefin resin I and ethylene-α-olefin copolymer rubber.

Examples of α-olefin monomer which is combined with ethylene to obtain ethylene-α-olefin copolymer rubber, are propylene, 1-butene, 1-pentene, 1-hexene, 4-methyl-1-pentene 5-methyl-1-hexane and 4-methyl-1-hexene. Further, a non-conjugated diene, e.g., ethylidenenorbornene, may be contained as a monomer together with such α-olefin monomer in one molecule of ethylene-α-copolymer to form ethylene-α-copolymer rubber.

The mol ratio of ethylene to α-olefin monomer in the ethylene-α-olefin copolymer rubber synthesized from ethylene and α-olefin monomer suitably ranges from 50/50 to 90/10, preferably from 70/30 to 85/15. The Mooney viscosity $ML_{1+4}$ (at 121° C.) of ethylene-α-olefin copolymer rubber is suitably 20 or above, preferably 40 to 80. Ethylene-α-olefin copolymer rubber in such numerical range is suitably used to ensure sufficient tensile strength of the obtained thermoplastic elastomer.

Such ethylene-α-olefin copolymer rubber which is combined with polyolefin resin I to synthesize the partial crosslinking type substance may be of any copolymer type, for instance, random, block or graft copolymer of ethylene and α-olefin.

As polyolefin resin I which is combined with such ethylene-α-olefin copolymer rubber to synthesize the partial crosslinking type substance may be used polyolefin resin which is active for crosslinking reaction taking place in the presence of a crosslinking agent, e.g., peroxide. Typical polyolefin resin active for the crosslinking reaction is a polymer containing ethylene as monomer, e.g., polymer of ethylene at one and copolymers of ethylene and a slight quantity of copolymerizable monomer other than ethylene.

The partial crosslinking type substance obtained from polyolefin resin I and ethylene-α-olefin copolymer rubber, is synthesized through kinetical heat treatment of ethylene-α-olefin copolymer rubber and polyolefin resin I and suitable hardening by a crosslinking reaction. By the term "kinetical heat treatment" is meant kneading of a mixture in a melted state as disclosed in Japanese Patent Disclosure 55-71738. More specifically, as disclosed in the same literature, the term refers to an operation of kneading the mixture of ethylene-α-olefin copolymer rubber and polyolefin resin active for crosslinking reaction while fusing the mixture in the presence of a crosslinking agent for causing partial crosslinking of ethylene-α-olefin copolymer rubber and polyolefin resin in the mixture and hardening the resultant resin until an adequate hardness or viscosity is obtained.

Specific examples of the crosslinking agent used for the crosslinking reaction between ethylene-α-olefin copolymer rubber and polyolefin resin are such well-known crosslinking agents as 1,3-bis(t-butylperoxyisopropyl)benzene or like organic peroxide.

The thermoplastic elastomer used for the outer layer of the surface layer of the multilayered molding according to the present invention may be constituted by mixture B, which incorporates polyolefin resin II added to the partial crosslinking type substance obtained from polyolefin resin I and ethylene-α-olefin copolymer.

Polyolefin resin II used together with the partial crosslinking type substance may be polyolefin compound of the same type as or different type from polyolefin resin I. Specific examples of polyolefin resin II are polyisobutylene, butyl rubber and like polyolefin resins which are inactive for crosslinking reaction taking place in the presence of peroxide. Such polyolefin resin inactive with respect to crosslinking reaction may be incorporated prior to the crosslinking reaction, which is suitable in view of facilitating the manufacture. Further, incorporating such polyolefin resin as isotactic polypropylene which is capable of degradation of the molecular weight by peroxide prior to the crosslinking reaction between polyolefin I and ethylene-α-olefin copolymer rubber is suitable in that doing so may permit adjustment of the hardness or viscosity of the obtained crosslinking type substance.

In case of adding polyolefin resin I to partial crosslinking type substance obtained after completion of crosslinking reaction, polyolefin resin active with respect to crosslinking reaction may be used. In this case, it is possible to use the most desirable polyolefin resin, i.e., a mixture of polyethylene and polypropylene. When using the mixture of polyethylene and polypropylene as the polyolefin resin, particularly low density polyethylene/polypropylene mixture is preferred. The weight ratio of low density polyethylene and polypropylene suitably used as polyolefin resin II is suitably 10/90 to 70/30. Where the weight ratio of low density polyethylene and polypropylene is in this range, the mixture may be readily molded to obtain a sheet, and the molding thus obtained is not easily damaged by mechanical forces.

The thermoplastic elastomer used for the outer layer may contain, together with ethylene-α-olefin copolymer rubber partial crosslinking type substance, a mineral oil softening agent together with or in lieu of the above polyolefin resin II. Examples of the mineral oil softening agent incorporated together with the ethylene-α-olefin copolymer rubber partial crosslinking type substance are divinylvenzene and paraffin mineral oil. Such mineral oil softening agent may be added prior to the crosslinking reaction.

Where thermoplastic elastomer used as the main component of the outer layer is constituted by mixture B of polyolefin resin II and ethylene-α-olefin copolymer rubber partial crosslinking type substance, the weight ratio of polyolefin resin II to ethylene-α-olefin copolymer rubber partial crosslinking type substance is suitable 90/10 to 10/90, preferably 80/20 to 20/80, where the numerator is for polyolefin resin II and the denominator is for ethylene-α-olefin copolymer rubber partial crosslinking type substance.

The thermoplastic elastomer having such constitution is highly flexible, not easily damaged and excellently hot- and cold-resistant. Its flexibility is not changed with temperature changes, and also its surface is free from stickiness which is peculiar to soft polyvinyl chloride containing a plasticizer. Thus, it can find extensive applications as material for an outer layer of molding.

Example of the thermoplastic elastomer composed of partial crosslinking type substance A and mixture B are as follows.

(I) A thermoplastic composition composed of (1) a polyolefin resin; a polymer of sole ethylene or propylene or a copolymer thereof and a small quantity of another polymerizable monomer and (2) a partial crosslinking type blend of ethylene-α-olefin copolymer rubber as binary copolymer rubber of ethylene and α-olefin with a carbon number of 3 to 14 or a tertiary copolymer rubber obtained by copolymerizing the binary copolymer rubber noted above with a polyethylene compound.

(II) A thermoplastic composition obtained by kinetically heat treating a blend of polyolefin resin and ethylene-α-olefin copolymer rubber.

(III) A thermoplastic composition obtained by blending polyolefin resin with the composition obtained by kinetically heat treating polyolefin resin and ethylene-α-olefin copolymer rubber.

(IV) (1) A peroxide crosslinking type polyolefin resin, typically a polymer consisting solely of ethylene or a copolymer of ethylene and a slight quantity of another copolymerizable monomer, a peroxide non-crosslinking type resin, typically polymer of sole propylene or copolymer or propylene and a slight quantity of other copolymerizable monomer, and (2) a thermoplastic composition obtained by kinetically heat treating ethylene-α-olefin copolymer rubber blend.

As the flexible foam body made of polyolefin resin for forming the intermediate foamed layer in the surface layer, any foam body can be used if they have flexibility because the flexible foam body is added for the purpose of removing hard foam. However, in order to realize good adhesion with the above-described thermoplastic elastomer, polyolefin synthetic resin foam bodies such as polyethylene and polypropylene are preferably to be used. As the foam body, for example, a crosslinked foam bodies using an azide crosslinking agent disclosed in Japanese Patent Publication No. 39-25500, 40-25351, and 40-25352 or crosslinked foam bodies caused by radial rays can be used. The preferred expansion ratio is 5 to 50. The thickness of the foam body to be used is 1 to 10 mm.

As a result of the presence of such an intermediate foamed body made of polyolefin flexibility can be given to the surface layer, and the thus-obtained flexibility causes the flexibility of the above-described thermoplastic elastomer to be improved. As a result, the touch of the surface of the molded body can be further improved. Therefore, the molded body according to the present invention becomes extremely suitable for use as the interior parts of automobiles and it becomes excellent from the viewpoint of safety because of the involved shock absorbing performance.

The protection film layer mainly composed of a thermoplastic elastomer which is either a partial crosslinking type substance A obtained from polyolefin resin and ethylene-α-olefin copolymer rubber or a mixture B of polyolefin resin and ethylene-α-olefin copolymer rubber partial crosslinking type substance is provided for the purpose of protecting the intermediate foamed layer from the molten resin used for forming the base molding body at the time of molding so that the intermediate foamed layer is protected from being crushed caused by pressure or heat at the time of molding. As a result, the flexibility of the surface layer can be secured.

Various synthetic resins can be used as the material for the protection film layer, and in which good adhesion with the intermediate foamed layer and the base molding body is desired. In addition, an improved performance of attraction and contact with an inner surface of a mold at the time of vacuum molding is desired. Therefore, the above-described thermoplastic elastomer is preferably used as the outer layer. The thickness for the outer is 0.2 to 1.0 mm.

The synthetic resin for forming the base molding body made of polyolefin can comprise thermoplastic resins and/or the above-described thermoplastic elastomer.

As the thermoplastic resin, regardless of the crystalline or non-crystalline characteristics: polyolefin such as low density polyethylene, high density polyethylene, polypropylene, poly-1-butene, poly-4-methyl-1-pentene or a random or block copolymer of α-olefin which is ethylene, propylene-1-butene, 4-methyl-1-pentene and so on; ethylene vinyl compound copolymer such as ethylene acrylic acid copolymer, ethylene vinyl acetate copolymer, ethylene vinyl alcohol copolymer, ethylene vinyl chloride copolymer; styrene resins such as polystyrene, acrylonitrile-styrene copolymer, ABS, methacrylic acid methyl-styrene copolymer, α-methylstyrene-styrene copolymer; vinyl chloride such as polyvinyl chloride, polyvinylidene chloride, vinyl chloridevinylidene chloride copolymer; polyacrylic acid ester such as polyacrylic acid methyl and polymethacrylic acid methyl; polyamide such as nylon 6, nylon 6-6, nylon 6-10, nylon 11, nylon 12; thermoplastic polyester such as polyethylene telephthalate, polybutylene telephthalate; polycarbonate; polyphenyleneoxide; their mixture; or silicone or urethane resins can be used.

A suitable material can be selected from the above-described group to meet the molding conditions, purpose, characteristics and cost. Polyolefin resin, in particular, polypropylene is preferably to be used. A mixed compound of this polypropylene and the above-described thermoplastic elastomer can be used. These molding materials can be arranged, within the range in which the required physical characteristics are not lost, in such a manner that wood chips, fiber chips or inorganic filler or the like can be mixed at needs for the purpose of realizing foam by using foaming agent, or for the purpose of further improving the physical properties. The shape of the base molding body can be arranged freely such as sheet-like, plate-like, and 3D shapes.

The combined sheets or films structured by (1), (2) and (3) can be arranged in such a manner that, for example, sheets (1), (2) and (3) are respectively, previously and solely molded by a T-die method or inflation method, and then they are adhered to each other to be layered.

For example, a thermoplastic elastomer of the polyolefin resin and the partially crosslinked ethylene-α-olefin copolymer rubber is extruded by the T-die method by using an extruder at substantially 150° to 250° C. The thus-extruded molten film or sheet thermoplastic elastomer is layered with a foam sheet so as to be taken by a pair of rollers for the purpose of molding them. At this time, it is preferable for them to be heated by a heater in prior to performing layering the surfaces of the two sheets to be bonded. Then, either of a pair of the rollers is arranged to be an embossing roller which has been heated up to 60° to 70° C., while another roller is arranged to be a normal roller which has not been heated. Then, by bringing the outer side of (1) into contact with the embossing roller, the outer surface can be subjected to the embossing work at the time of manufacturing the combined sheet. As a result, generation of luster can be prevented when molded with the base molding body.

Next, the combined sheet according to the present invention can be manufactured by layering this film to the foamed sheet side of the above-described double layered sheet and by being taken into a pair of the rollers, with the protection film extruded.

The embossing work can be alternatively performed by using a mold having a cavity with an inner surface as described in the embodiment to be described later. Letters, pictures or patterns can be printed as needed to the combined sheet or film according to the present invention.

A further description upon the above-described manufacturing method (A) will be given with reference to a device for achieving this method. This method comprises at least a pair of injection mold having a cavity with an inner surface (1 and 2) as shown in FIGS. 1 (a) to (d). The female mold 1 is provided with an air intake passage 7 to be connected to a vacuum pump 6 for the purpose of reducing the negative pressure in a cavity 3. The inner surface of the female mold 1 is, as needed, provided with embossment or grain patterns.

The above-described combined sheet or film 4 is arranged to cover the opening portion of the cavity in the female mold 1 with this pair of mold(1, 2) opened. A heater portion 5 of the pre-heating device is brought to be positioned closer to the combined sheet or the film 4 in the opening portion so that the same is preheated. The temperature at this preheating is 150° to 200° C. As means for this preheating, it can be arranged to be heated air blowing or contact of a heating roller or the like in addition to the approaching the heater portion 5.

Then, the negative pressure on the inside of the cavity 3 in the female mold 1 is reduced by a vacuum pump 6. The above-described combined sheet or the film 4 is attracted and brought closer to the inner surface of the cavity {see FIG. 1 (b)}. At this time, since the combined sheet or the film 4 employs the above-described thermoplastic elastomer, it can be significantly easily brought to contact with the shape of the cavity of the mold (1, 2) so that any local cracks or wrinkles cannot be generated. In addition, the material can be introduced deep enough into the contour which forms the emboss pattern, therefore an excellent quantity of grain pattern can be transferred.

Then, the heater portion 5 is retracted, and the pair of the mold (1, 2) is, as shown in FIG. 1 (c), clamped, and the polyolefin resin in a fluidized and plasticized state is injected from the injection molding machine 8 to the cavity 3 so that it is taken out as a product after it has been cooled and solidified.

Since trimming can be performed in the mold (1, 2) simultaneously with clamping, the latter trimming becomes unnecessary.

Figure 2:
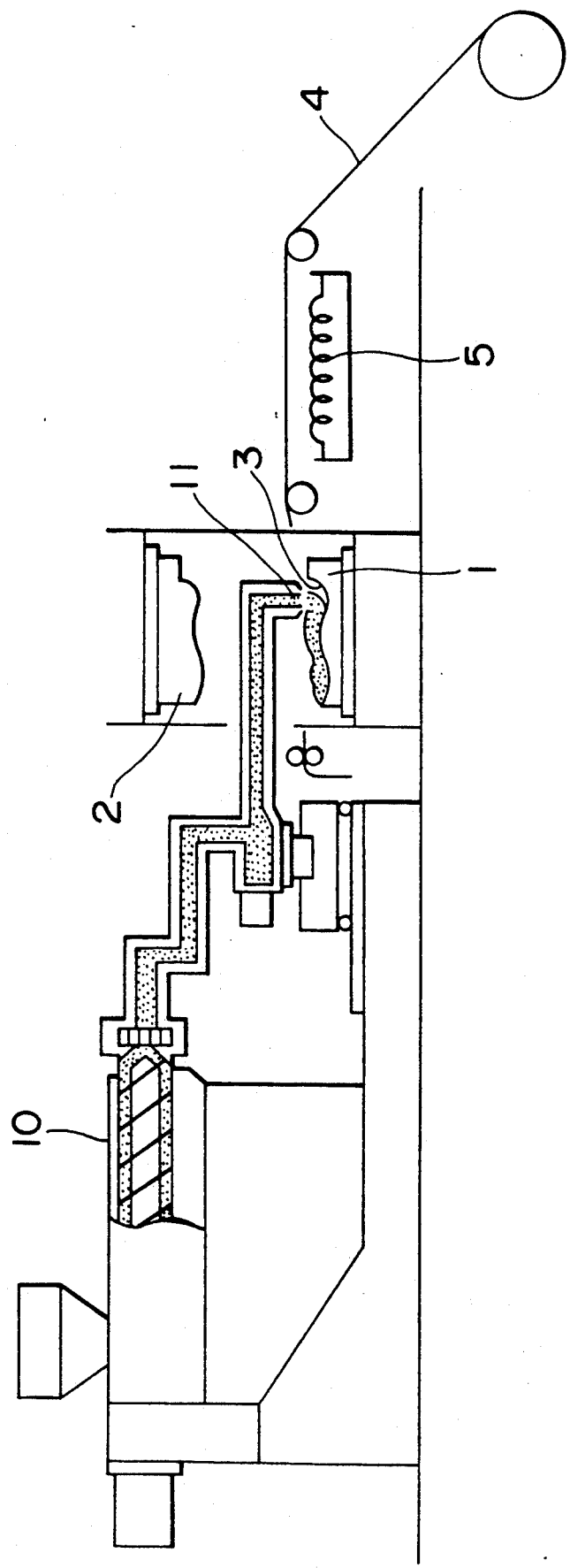
FIG. 2 is a schematic view of a device for use in the manufacturing method according to (B) or (B-2)

Then, the manufacturing method according to (B) will be described. In this case, as shown in FIG. 2, a pair of molding mold (1, 2) is provided which has a cavity 3 and includes lower female mold 1 and upper male mold 2. With the mold (1, 2) opened, the above-described combined sheet or film 4 is supplied into the mold (1, 2) with being preheated by the heater portion 5 of the preheating device, and it is arranged to cover the opening portion of the cavity in the female mold 1. Then, the above-described combined sheet or film 4 is attracted and brought into contact with the inner surface of the cavity of the mold (1, 2) by the attraction performed by the vacuum pump 6. In this case, an excellent performance of the above-described combined sheet or film 4 to be attracted and brought into contact with the die cavity 3 can be obtained.

Then, the polyolefin resin in fluidized and plasticized state is introduced from the extruder 10 into the cavity 3, and the mold is clamped. By this clamping, the polyolefin resin is distributed and filled in the cavity 3 due to the pressure. After the material has been solidified due to the ensuing cooling or heating, it can be taken out as a product. In this case, trimming can be performed in the mold (1, 2) simultaneously while performing the clamping.

The introduction of the polyolefin resin in fluidized and plasticized state into cavity 3 is preferably conducted in the following manner for the purpose of uniformly distributing it over the entire region of cavity 3: an injection nozzle 11 which is arranged to be capable of moving along the direction X-Y on the cavity, and the thus-provided injection nozzle 11 is arranged to be moving along a previously programmed way for the purpose of introducing the polyolefin resin in fluidized and plasticized state in cavity 3.

In the above-given description, the polyolefin resin in fluidized and plasticized state is the molten resin obtained by heating, kneading or dispersing by, for example, a screw extruder or a resin made fluidized and plasticized by a solvent.

In the manufacturing methods (A) and (B), another method may be employed such that: a mold for vacuum molding the above-described sheet or film by attracting and bringing it into contact with the inner surface of the cavity, and another mold for molding the multilayered molding according to the present invention in which the resin used for forming the base molding body are provided; first, a previously molded body made of the above-described combined sheet or film is vacuum molded by the mold for vacuum molding, and the thus-previously molded body is fitted into the cavity of the mold for molding. Then, in a case of the method (A), the mold for molding is clamped, and the polyolefin resin in fluidized and plasticized state is injected into the cavity to fill therein and to mold it. In the case of the method (B), the previously molded body which has been vacuum molded is fitted into the mold, and then the polyolefin resin in fluidized and plasticized state is introduced into the cavity thereof, and the clamping of the mold is performed for the purpose of molding.

The molded body made of polyolefin resin according to the present invention can be widely used as the exterior parts for automobiles in the form of a bumper, side molding, outer panel, emblem, as the interior parts for automobiles in the form of an instrument panel, console box, door inner, dash side and rear side plates, and various casings for home electronic products, bags, and cases for other purposes.

An embodiment of the present invention will be described.

Embodiment of The Manufacturing Method (A)

A plurality of combined sheets to be served as the surface layer were prepared. This combined sheet was previously heated and was subjected to the attracting work by a vacuum molding in which the combined sheet was attracted and positioned in close contact with the inner surface of the cavity of the female mold with the outer layer thereof arranged to contact the female mold. Next, the male mold was closed, and the molten resin for forming the base molding body made of polyolefin resin is injected from the inject molding machine in the cavity. Then, the thus-solidified combined sheet which has been integrated with the film was taken out by opening the mold.

The inner surface of the cavity of the above-described female mold has been provided with an embossment of the depth of 150μ, and the contact between the film and the base molding body, the depth of the embossment, touch, and the gross of the multilayered molding was evaluated. (1) The combined sheet which was used in this state will be described.

Outer Layer (1)

Films A to D to be described hereinafter are the films for the outer layers of the combined sheet.

Film A

The following components were used and a thermoplastic elastomer was prepared as follows:

Component A

Ternary copolymer rubber of ethylene-propylene-ethylidene norbornene; ethylene unit/propylene unit (mole ratio): 78/22, iodine number 15, Mooney viscosity (ML1+4, 121° C.) 61

Component B

Isostatic polypropylene resin; melt index 13 g/10 minutes (230° C.)

Component C

Naphthane process oil

Component D

A mixture constituted by 20 wt %, 1, 3-bis) tert-butyl peroxyisopropyl) benzene, 30 wt % divinyl benzene, and 50 wt % paraffin type mineral oil Method of Manufacturing Thermoplastic Elastomer After kneading the above described 55 parts by weight of the component A, 45 parts by weight of the component B, and 30 parts by weight of the component C at 180° C. for 5 minutes by a Banbury mixer in nitrogen gas, the thus-kneaded material was made square pellets by using a sheet cutter.

100 parts by weight of these square pellets and 1 part by weight of the component D were kneaded by a Henshel mixer. Then, the kneaded material was extruded by an extruder at 220° C. in nitrogen gas so that a thermoplastic elastomer was obtained.

Method of Manufacturing Film

The thus-obtained thermoplastic elastomer was extruded so as to be in the form of a sheet having a thickness of 0.5 mm by using a 90 mm diameter T-die extruder manufactured by Toshiba in the conditions that the screw thereof comprised a full flight screw, L/D was 22, the temperature at which the extruding was performed was 220° C., the T-die comprised a coat hanger die, and the taking off speed was 5 m/minute. Then, the thus-extruded materials was cooled by a cooling roll (the roll temperature 35° C.) so that a film A were obtained.

Film B

Liquid to form a first primer layer constituted by 10 parts by weight of chlorinated polypropylene, 2 parts by weight of silicic anhydride, and 88 parts by weight of toluene was applied once to the film A by using a 120-mesh gravure roller, and it was dried at 70° C. for 20 seconds.

Above this, liquid for forming a second primer layer constituted by 8 parts by weight of polyvinyl chloride, 2 parts by weight of a pigment, and 90 parts by weight of methylethylketone was printed to form a cloud-shaped pattern by using a gravure roller, and was again dried at 70° C. for 20 seconds.

Next, liquid for forming the top coat layer constituted by 5 parts by weight of polyvinyl chloride, 5 parts by weight of polyacrylic acid ester, 3 parts by weight of silicic anhydride, and 87 parts by weight of methyl ethyl ketone was applied once by using a 100 mesh-gravure roller. The thus-obtained film was heated up to 180° C. at the surface thereof by using a far infrared ray heater, and the embossing treatment was performed so that a film B was obtained.

Film C

A dry blended material constituted by 80 parts by weight of thermoplastic elastomer which has been used for forming the film A and 20 parts by weight of low density polyethylene [density 0.917 g/cm$^3$, melt index 6.5 g/10 minutes (190° C.)] was supplied to the T-die extruder, so that a film C was obtained in the method similar to the method of preparing the film A.

Film D

A film D was obtained by subjecting the film C to the similar surface treatment for the film B.

Intermediate foamed layer

Next, the following foamed material was used for forming the intermediate foamed layer.

PPF (1)

A propylene foam displaying the expansion ratio of 15 times, and thickness of 2.5 mm.

PPF (2)

A propylene foam displaying the expansion ratio of 20 times, and thickness of 3.0 mm.

PEF (1)

A polyethylene foam displaying the expansion ratio of 25 times, and thickness of 2.5 mm.

PEF (2)

A polyethylene foam displaying the expansion ratio of 25 times, and thickness of 3.0 mm.

Protection layer

The following film for forming the protection film layer was used.

Protection film (1)

The same material as the thermoplastic elastomer film A for serving as the outer layer was used.

Protection film (2)

The same material as the thermoplastic elastomer film C for serving as the outer layer was used.

Combined sheet

By properly selecting and combining the above-described outer layer, intermediate foamed layer and the protection film, the following combined sheet for serving as the outer surface was formed.

The process for combining them was performed in the method described above, and the heating temperature was 210° C. in a case where the PPF was used, while it was 180° C. in a case where the PEF was used. The taking line speed was 5 m/min.

Combined sheet A outer layer; film B, formed material; PPF (1), protection film; (2) thickness 0.2 mm

Combined sheet B outer layer; film B, formed material; PPF (1), protection film; (2) thickness 0.4 mm

Combined sheet C outer layer; film B, formed material; PPF (1), protection film; (2) thickness 0.6 mm

Combined sheet D outer layer; film B, formed material; PPF (1), protection film; (2) thickness 0.8 mm

Combined sheet E outer layer; film D, formed material; PPF (2), protection film; (2) thickness 0.4 mm

Combined sheet F outer layer; film D, formed material; PPF (2), protection film; (2) thickness 0.6 mm

Combined sheet G outer layer; film A, formed material; PEF (1), protection film; (1) thickness 0.6 mm

Combined sheet H outer layer; film A, formed material; PEF (1), protection film; (2) thickness 0.6 mm

Combined sheet I outer layer; film C, formed material; PEF (2), protection film; (1) thickness 0.6 mm

Combined sheet J outer layer; film C, formed material; PEF (2), protection film; (2) thickness 0.6 mm (2) Next, the following materials for forming the base molding body were used.

Forming material PP(1)

Polypropylene of the melt index (ASTM D-1238-65T, 230° C.)=13, and density 0.91 g/cm$^3$

Forming material PP(2)

Polypropylene of MFR 8 containing pulverized talc by 20 wt %

Forming material PP(3)

Polypropylene of MFR 5 containing pulverized talc by 10 wt % and short glass fiber by 10 wt %.

(3) In this embodiment, the vacuum molding conditions were as follows:
Heater temperature: at the outer layer 300° C. at the protection layer 350° C.
Time period for previous heating; 70 seconds
Vacuum pressure; 700 mmHg (4) In this embodiment, the injection molding conditions were as follows:
Molding machine; Dyanamelter (manufactured by Meiki Co., Ltd.)
Molding temperature; 220° C.
Injecting pressure; primary pressure 1000 kg/cm$^2$ secondary pressure 700 kg/cm$^2$
Injecting speed; maximum speed
Molding cycle; 90 seconds/cycle
Gate; direct gate (the land length 10 mm, width 10 mm, thickness 3 mm)
Molding; length 500 mm, width 400 mm, thickness 3 mm

Method of sampling

A peeling test piece of 100 mm in length and 25 mm wide was punched out from the above-described molding.

Peeling test

The combined sheet as a surface layer was peeled from the above-described test sample, and it was pulled in the reverse direction of 180 degrees at the peeling speed of 25 mm/min. The peeling strength at the time of peeling was evaluated. The peeling strength was shown by a value obtained by dividing the peeling load by the width of the test piece.

The results are shown in Table 1. The case where the surface layer was broken was indicated by the description "material broken".

Embossment depth

The distance between the top and the bottom of the embossment transferred to the surface layer made of the thermoplastic elastomer was measured. The results are shown in Table 1.

Touch

Hardness was measured by using a rubber tester.

Gloss

Light is directed incident by 60 degrees upon the embossed surface layer. The reflectance was expressed by using %.

Appearance test

The appearance of the product was visually tested. As a result, the surface layer was free from any defects such as cracks or wrinkles.

combined sheet to make it distribute properly. Next, the male mold was closed, and then the same was opened to take the product when the molten resin was solidified and integrated with the film.

An embossment of 150μ in depth has been applied to the inner surface of the cavity of the above-described female mold. The contact between the combined sheet and the base molding body of the multilayered molding, the emboss depth, touch, and the gloss were evaluated.

(1) The material for forming the base molding body was as follows:

As PP (1), polypropylene of melt index (ASTM D-1238-65T, 230° C.) of 3, and density of 0.91 g/cm$^3$ was used.

As PP (2), polypropylene of MFR2 containing pulverized talc by 30 wt % was used.

As PP (3), polypropylene of MFR 0.7 containing pulverized talc by 15 wt % and short glass fiber by 15 wt % was used.

(2).The molding conditions in this embodiment were as follows:

Molding machine; Ikegai ISM-300
Screw diameter; 50 mm
Resin temperature; 230° C.
Pressing pressure; 200 kg/cm$^2$
Molding cycle; 50(sec)
Molding; length 500 mm, width 500 mm, thickness 3 mm (3) Other molding conditions were the same as those for the above-described embodiment.

(4) The method of evaluating the multilayered molding in this embodiment will be described.

TABLE 1

| | | E (1) | E (2) | E (3) | E (4) | E (5) | E (6) | E (7) | E (8) | E (9) | E (10) |
|---|---|---|---|---|---|---|---|---|---|---|---|
| Type of the combined sheet | | A | B | C | D | E | F | G | H | I | J |
| Outer layer film | | B | B | B | B | D | D | A | A | C | C |
| Foamed body (Intermediate Foamed layer) | type | PPF | PPF | PPF | PPF | PPF | PPF | PEF | PEF | PEF | PEF |
| | expansion ratio | 15 | 15 | 15 | 15 | 20 | 20 | 25 | 25 | 25 | 25 |
| | thickness (mm) | 2.5 | 2.5 | 2.5 | 2.5 | 3.0 | 3.0 | 2.5 | 2.5 | 3.0 | 3.0 |
| Protection film | number | (2) | (2) | (2) | (2) | (2) | (2) | (1) | (2) | (1) | (2) |
| | thickness (mm) | 0.2 | 0.4 | 0.6 | 0.8 | 0.4 | 0.6 | 0.6 | 0.6 | 0.6 | 0.6 |
| Material for base molding body | | PP (1) | PP (1) | PP (1) | PP (1) | PP (2) | PP (2) | PP (3) | PP (3) | PP (3) | PP (3) |
| Peeling strength between the protection film and the base molding material (kg/cm) | | material broken | material broken | material broken | material broken | material broken | material broken | material broken | material broken | material broken | material broken |
| Thickness of the injected foaming body (intermediate Foamed layer) (mm) | | 1.0 | 2.0 | 2.3 | 2.3 | 2.6 | 2.8 | 2.1 | 2.4 | 2.4 | 2.7 |
| Flexibility hardness (type-C) | | 55 | 47 | 45 | 43 | 36 | 33 | 36 | 34 | 33 | 31 |
| Depth of embossment (μ) | | 135 | 133 | 130 | 130 | 128 | 130 | 130 | 128 | 125 | 130 |
| Gloss (%) | | 4 | 4 | 4 | 4 | 3 | 3 | 7 | 8 | 8 | 7 |

Embodiment of manufacturing method (B)

The same combined sheet as that used in the above-described embodiment was previously heated. The combined sheet was subjected to the attracting work by a vacuum molding in which the same is attracted and positioned in close contact with the inner surface of the cavity of the female mold with the outer layer thereof positioned to confront the female mold. Then, molten resin for forming the base molding body was put on the A peeling test piece of 100 mm in length and 25 mm wide was punched out from the above-described molding. The peeling test, emboss test, touch, and gloss were evaluated similarly to the above-described embodiment. The results are as shown Table 1.

The appearance of the product was visually examined. As a result, the surface layer was free from defects such as cracks or wrinkles.

As described above, according to the present invention, by using the combined sheet or film made of the above-described thermoplastic elastomer, the flexible foaming material, and the protection film, an excellent attraction and contact with the inner surface of the cavity can be obtained at the time of performing the vacuum molding. Therefore, no defective molding can be generated and a complex 3D shape can be formed. In addition, since the outer layer made of the thermoplastic elastomer can be introduced deeply into the grooves of the embossment or grain patterns provided on the inner surface of the cavity, an excellent quality graining can be performed.

Since the molding according to the present invention has the surface layer described above, an excellent flexibility can be achieved in the surface so that comfortable can be obtained, and in addition, a tough damage resisting molding can be obtained. Therefore, it can be preferably used as the interior and the exterior parts for automobiles.

In manufacturing the molding according to the present invention, since the protection film layer is present, the crash of the intermediate layer at the time of injection molding can be prevented.

The method of manufacturing the multilayered molding in which the thermoplastic elastomer sheet or film is layered as the surface, layer on the surface of the base molding body made of polyolefin resin, the thermoplastic elastomer comprising polyolefin resin and ethylene-α-olefin copolymer rubber, is the above-described manufacturing method in which only the outer layer of the combined sheet or film is taken out to be layered on the base molding body made of polyolefin resin. That is, the thermoplastic elastomer in this state is the same as the thermoplastic elastomer forming the above-described outer layer.

The polyolefin resin used for forming the base molding body is the same as the base molding body described above. It is preferable for the polyolefin resin for forming the base molding body to expand by using a blowing agent.

The manufacturing methods (A-2) and (B-2) are the same as (A) and (B), but the difference between them lies in that the combined sheet or film is replaced by the above-described thermoplastic elastomer sheet or film.

A method of manufacturing a multilayered molding in which the above-described thermoplastic elastomer sheet or film is layered as the surface layer on the surface of the base molding body made of polyolefin resin will be described.

Manufacturing method (A-2)

In prior to the execution, the following four types of thermoplastic elastomer films A, B, C and D were manufactured, and they were previously heated. In a case where they were applied with a surface treatment, the treated side thereof is positioned to contact the female mold. The attracting work was performed by vacuum molding in which the films were attracted and contact with the inner surface of the cavity of the female mold. Next, the male mold was closed, and then molten resin for forming the base molding body made of polyolefin resin is injected from the injecting machine in the cavity. The die was opened to take out the material which has been solidified and integrated with the film.

An embossment of depth of 150μ has been applied to the inner surface of the cavity of the above-described female mold. The contact between the film and the base molding body forming the multilayered molding, embossing depth, touch, and gloss were evaluated.

(1) The thermoplastic elastomer films A to D used here were the same as the above-described films A to D The method of manufacturing the thermoplastic elastomer and that of the film are the same. In this embodiment, in addition to the above-described film, a soft PVC film containing DOP by 50 parts was prepared as the comparative film.

(2) The following materials for forming the base molding body were used.

Forming material TPE (1)

70 parts by weight of ethylene-propylene-ethylidene norbornene copolymer rubber {to be called EPDM (1) hereinafter} of 70 mol % ethylene, iodine number of 15, Moonie viscosity ML1+4 (100° C.) 120, 30 parts by weight of polypropylene (to be called PP hereinafter) displaying the melt index thereof (ASTM D-1238-65T, 230° C.) 13, and density of 0.91 g/cm³, 10 parts by weight of butyl rubber (Esso IIR-065, unsaturated rate of 0.8 mol % or less, to be called IIR hereinafter), and 30 parts by weight of paraffin type process oil (to be abbreviated oil hereinafter were kneaded at 190° C. for 5 minutes by a Banbury mixer in nitrogen gas. Next, square pellets were manufactured by a sheet cutter after it has been passed through the rollers.

Then, 100 parts by weight of the square pellets, 0.3 parts by weight of 1,3-bis(tert-butylperoxyisopropyl) benzene {to be abbreviated peroxide (A) hereinafter}, 0.5 parts by weight of divinyl benzene (to be abbreviated DVB hereinafter) was mixed by using a Henshel mixer. Next, these pellets were extruded at 220° C. in nitrogen gas so that MFR 3 g/10 min of thermoplastic elastomer {TPE(1)} was obtained.

Forming, material TPE (2)

60 parts by weight of ethylene-propylene-ethylidene norbornene copolymer rubber {to be called EPDM (2) hereinafter} in the form of pellet displaying the ethylene content of 78 mol %, iodine number of 10, Moonie viscosity ML1+4 (100° C.) 160 (therefore, 43 parts by weight of the EDPM, and 17 parts by weight of oil), 40 parts by weight of PP, and 0.5 parts by weight of 2, 5-dimethyl-2,5-di(t-butyl peroxy) hexyne-3 (to be abbreviated paroxide (B) hereinafter} were stirred and mixed by a Henshel mixer. This mixtures was extruded by an Waner biaxial extruder (L/D=43, engagement type, one rotary direction, three-thread type screw) at 220° C. in nitrogen gas. As a result, thermoplastic elastomer of MFR 15 g/10 min (TPE (2)} was obtained.

Forming material PP (1)

Polypropylene displaying melt index (ASTM D-1238-65T, 230° C.)=13, and density of 0.91 g/cm³,

Forming material PP (2)

Polypropylene of MFR 8 containing pulverized talc by 20 wt %.

Forming material PP (2)

Polypropylene of MFR 5 containing pulverized talc by 10 wt % and short glass fiber by 10 wt %. (3) In this embodiment, the vacuum molding conditions were as follows:

Heater temperature; 360° C.
Preheating time; 45 seconds
Vacuum pressure; 700 mmHg (4) In this embodiment, the injection molding conditions were as follows:
Molding machine; Dynamelter (manufactured by Meiki Co., Ltd.)
Molding temperature; 220° C.
Injecting pressure; primary pressure 1000 kg/cm$^2$
Secondary pressure 700 kg/cm$^2$
Injecting speed; maximum speed
Molding cycle; 90 seconds/cycle
Gate; direct gate (land length 10 mm, width 10 mm, thickness 3 mm)
Molding; length 500 mm, width 400 mm, thickness 3 mm (5) The method of evaluating the multilayered molding according to the present invention will be described.

Method of sampling

Figure 3:
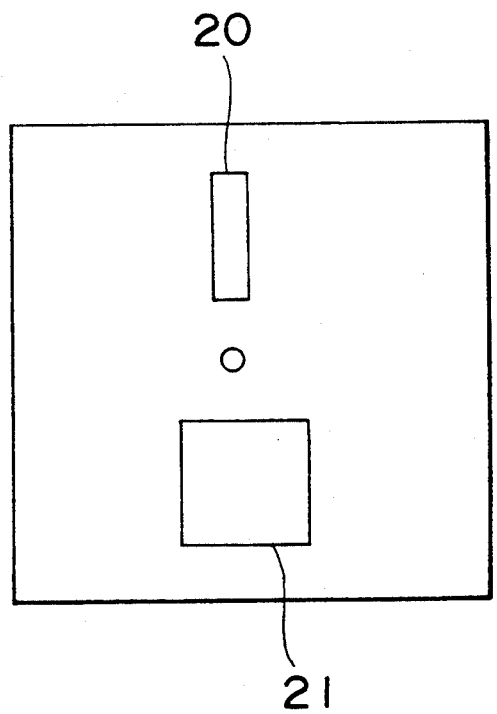
FIG. 3 is a plan view illustrating a method of taking samples.

A peeling test piece of 100 mm in length and 25 mm wide and a cross cut adhesion test piece of 100 mm in length and 100 mm in width were punched out from the above-described molding as shown in FIG. 3

Peeling test

The thermoplastic elastomer film on the surface layer was peeled from an end of the peeling test piece, and was pulled in the reverse direction of 180 degrees at speed of 25 mm/min. The peeling strength at this time was evaluated. The peeling strength was indicated by a value obtained by dividing the peeling load by the width of the test piece.

The results are as shown in Table 2. The case when the film was broken was expressed by the description "material broken".

Cross cut adhesion test

The film surface was cut by using a sharp razor at intervals of 2 mm and depth of 1 mm to make 11 cuts. In addition, 11 parallel cuts were made perpendicular to the former 11 cuts.

As a result, 100 pieces of the cut block were made. A Nichiban cellophane adhesive tape was put to cover all of 100 blocks, and then the tape was rapidly peeled to observe the peeled state. The evaluation was performed in such a manner that the residual blocks in 100 blocks/100 were expressed. 100/100 represents no peeling, while 0/100 represents the state in which all were peeled. The results are shown in Table 2.

Embossment depth

The distance between the top and the bottom of the embossment transferred to the surface layer made of the thermoplastic elastomer was measured. The results are shown in Table 2.

Touch

The surface layer was finger-touched, and the degree of the touch was indicated by the following 5 grades.
5 ... extremely soft
4 ... soft
3 ... normal
2 ... hard
1 ... very hard

Gloss

Light was made incident by 60 degrees upon the surface layer to which the embossment has been applied. The reflectance was expressed by using %.

Appearance test

The appearance of the product was visually tested. The surface layer was free from defects such as cracks or wrinkles.

TABLE 2

|  | E (11) | C (1) | C (2) | E (12) | C (3) | E (13) | C (4) | E (14) | C (5) | E (15) | C (6) | E (16) | E (17) |
|---|---|---|---|---|---|---|---|---|---|---|---|---|---|
| Vacuum Molded Film | B | — | PVC | D | — | D | — | D | — | D | — | A | C |
| Material for base molding body | TPE (1) | TPE (1) | TPE (1) | TPE (2) | TPE (2) | PP (1) | PP (1) | PP (2) | PP (2) | PP (3) | PP (3) | PP (1) | PP (1) |
| Peeling Strength (kg/cm) | material broken | — | 0.5 or less | material broken | — | material broken | — | material broken | — | material broken | — | material broken | material broken |
| Cross cut adhesion test (kg/cm) | 100/100 | — | 0/100 | 100/100 | — | 100/100 | — | 100/100 | — | 100/100 | — | 100/100 | 100/100 |
| Emboss depth (μ) | 120 | 80 | 90 | 140 | 90 | 135 | 85 | 130 | 80 | 130 | 80 | 125 | 130 |
| Touch | 5 | 5 | 5 | 5 | 4 | 4 | 2 | 4 | 1 | 4 | 1 | 4 | 4 |
| Gloss (%) | 3 | 10 | 4 | 3 | 10 | 3 | 40 | 3 | 35 | 3 | 30 | 7 | 7 |

E: Embodiment C: Comparative Example

Embodiment of manufacturing method (B-2)

The thermoplastic elastomer film was previously heated. Then, when a surface treatment has been applied to the film, with the treated side thereof positioned to contact the female mold, the film was attracted and brought into contact with the inner surface, of the cavity of the female mold. Next, the molten polyolefin resin for forming the base molding body was, in a proper distribution, put on the film, and the male mold was closed. When the molten resin was solidified and integrated with the film, the mold was opened to take out the material.

Embossment of depth 150μ has been provided for the inner surface of the cavity of the female mold. The contact between the film and the base molding body of the layered molding, embossing depth, touch, and gloss were evaluated.

(1) A film and vacuum molding conditions were the same as those for the above-described embodiment (A-2).

(2) The materials for forming the base molding body were as follows:

TPE (1) and TPE (2) were the same as those for the above-described embodiment. However, as PP (1), different from the above-described embodiment, polypropylene displaying melt index (ASTM D-1238-65T, 230° C.) 3, and density of 0.91 g/cm³ was used. As PP (2), polypropylene of MFR 2 containing pulverized talc by 30 wt % was used.

As PP (3), polypropylene of MFR 0.7 containing pulverized talc by 15 wt % and short glass fiber by 15 wt % was used.

(3) The molding conditions in this embodiment were as follows:
Molding machine; Ikegai ISM-300
Diameter of screw; 50 mm
Resin temperature; 230° C.
Pressing pressure; 200 kg/cm²
Molding cycle; 50 sec
Molding; length 500 mm, width 500 mm thickness 3 mm (4) The method of evaluating the multilayered molding according to this embodiment will be described.

A peeling test piece of 100 mm in length and 25 mm in width and a cross cut adhesion test piece of 100 mm in length and 100 mm in width were punched out from the molding. The peeling test, cross cut adhesion test, embossing depth, touch and gloss were evaluated similarly to the above-described embodiment. The results are shown in Table 3.

In addition, a visual test was applied to the molding, as a result of which, no defects such as cracks or wrinkles were not observed in the surface layer.

resisting damage. Therefore, it can be preferably used as the interior or exterior parts for automobiles In addition, it can be used for the purpose in which the combined sheet is used.

What is claimed is:

1. A multilayered molding in which the surface of its base molding body made of polyolefin resin is layered with a surface layer, the surface layer of the multilayered molding comprising:

(1) an outer layer formed by a thermoplastic elastomer, which is constituted by a partial crosslinking type substance A obtained from polyolefin resin and ethylene-α-olefin copolymer rubber, a mixture B of polyolefin resin and ethylene-α-olefin copolymer rubber partial crosslinking type substance or both, (2) an intermediate foamed layer made of flexible foaming material formed of a polyolefin resin foam body; and (3) a protective film layer mainly composed of a thermoplastic elastomer which is either a partial crosslinking type substance A obtained from polyolefin resin and ethylene-α-olefin copolymer rubber or a mixture B of polyolefin and ethylene-α-olefin copolymer rubber partial crosslinking type substance sandwiched between the base molding body and the intermediate foamed layer.

2. A multilayered molding according to claim 1 wherein the thermoplastic elastomer for forming said outer layer is the mixture B of polyolefin resin and ethylene-α-olefin copolymer rubber partial crosslinking type substance in the weight ratio of 90/10 to 10/90.

3. A multilayered molding according to claim 2, wherein the polyolefin resin is a mixture of low density polyethylene and polypropylene in the weight ratio of 10/90 to 70/30.

4. A multilayered molding according to claim 2, the

TABLE 3

| | Embodiment(s) | | | | | | | | | | | E: Embodiment C: Comparative Example | |
|---|---|---|---|---|---|---|---|---|---|---|---|---|---|
| | E (18) | C (6) | C (7) | E (19) | C (8) | E (20) | C (9) | E (21) | C (10) | E (22) | C (11) | E (23) | E (24) |
| vacuum molded film | B | — | PVC | D | — | D | — | D | — | D | — | A | C |
| Material for base molding body | TPE (1) | TPE (1) | TPE (1) | TPE (2) | TPE (2) | PP (1) | PP (1) | PP (2) | PP (2) | PP (3) | PP (3) | PP (1) | PP (1) |
| Peeling strength (kg/cm) | material broken | — | 0.5 or less | material broken | — | material broken | — | material broken | — | material broken | — | material broken | material broken |
| Cross cut adhesion test | 100/100 | — | 0/100 | 100/100 | — | 100/100 | — | 100/100 | — | 100/100 | — | 100/100 | 100/100 |
| Emboss depth (μ) | 125 | 60 | 70 | 145 | 80 | 140 | 65 | 140 | 65 | 135 | 60 | 120 | 140 |
| Touch | 5 | 5 | 5 | 5 | 4 | 4 | 2 | 4 | 1 | 4 | 1 | 4 | 4 |
| Gloss (%) | 3 | 8 | 4 | 3 | 9 | 3 | 38 | 3 | 32 | 3 | 25 | 7 | 8 |

As described above, by using the thermoplastic elastomer as the material for forming the surface layer, an excellent attraction and contact to the inner surface of the cavity can be obtained at the time of performing the vacuum molding. As a result, no defective molding can occur, and a complicated 3D shape can be formed. In addition, the material can be introduced into the grooves of the embossment or the grain pattern on the inner surface of the cavity, and an excellent graining can be performed Since the molding according to the present invention is structured by multi-layering the thermoplastic elastomer surface layer, the surface can be made flexible, and smooth touch. In addition, the molding can be made ethylene-α-olefin copolymer rubber used in the ethylene-α-olefin copolymer rubber partial crosslinking type substance is constituted by ethylene and α-olefin in the mole ratio of 50/50 to 90/10 and has a Mooney viscosity $ML_{1+4}$ (121° C.) of 20 or above.

5. A multilayered molding according to claim 1, wherein said base molding body is made of foamed polyolefin resin.

6. A multilayered molding according to claim 1, wherein the surface of said outer layer is applied with embossment.

* * * * *